F. Draper.
Inkstand.

No. 59.
1,164.

Reissued Apr. 2, 1861.

UNITED STATES PATENT OFFICE.

FRANCIS DRAPER, OF EAST CAMBRIDGE, MASSACHUSETTS.

IMPROVEMENT IN FOUNTAIN-INK STANDS.

Specification forming part of Letters Patent No. 7,885, dated January 7, 1851; Reissue No. 1,164, dated April 2, 1861.

*To all whom it may concern:*

Be it known that I, FRANCIS DRAPER, of East Cambridge, in the county of Middlesex and State of Massachusetts, have invented certain new and useful Improvements in Inkstands; and I do hereby declare that the following is such a full and clear description thereof as, when taken in connection with the accompanying drawings, which form part of this specification, to enable others skilled in the manufacture of fountain and other inkstands to make and use the same.

Figure 2:
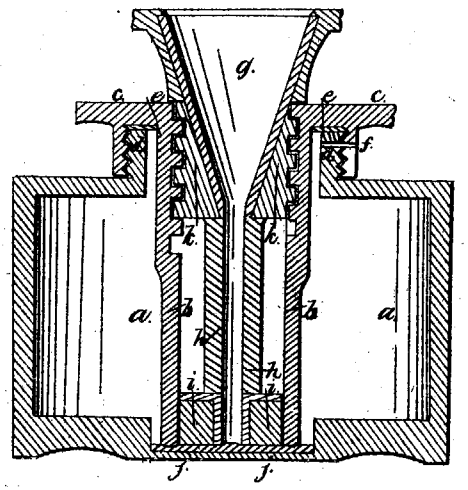
Figure 1:
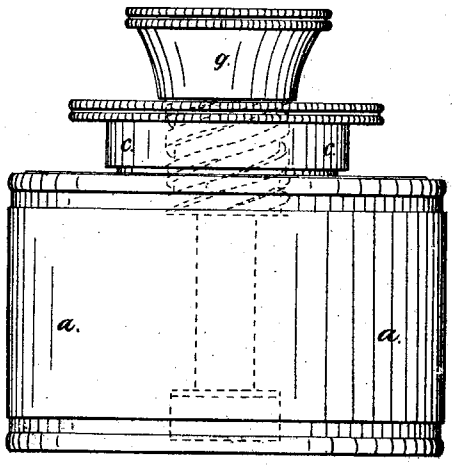

In the accompanying drawings, Figure 1 represents an elevation of an inkstand constructed according to my improvement, and Fig. 2 a vertical section thereof.

In fountain-inkstands of previous construction, various modes or means essentially differing from this my improvement, which embraces a novel cut-off and measuring action in such contrivances, have been adopted for excluding the atmospheric air from the larger body of ink in the reservoir that supplies the dipping-cup, so as to check or prevent evaporation, which impairs the limpid character of the fluid. Such previous constructions have also been designed to prevent the liability of the ink in the cup to overflow by reason of the expansion of the air in the reservoir when the inkstand is left exposed to the sun or subjected to the atmosphere of a warm room. All these former contrivances, however, have for various reasons been found deficient or objectionable in practice and have generally been attended with inconveniences which have more than compensated their advantages, or, where attaining their ends, have failed to accomplish other results equally if not more important. Such defects are avoided by this my invention, which perfectly secures, or may perfectly secure, in a novel manner, the purposes already stated of previous attempts, and which also, by its cut-off and measuring action or ability, effects yet more, and such additional features or features of leading value.

By my improvement, I shut off the main portion or body of the ink in the reservoir from that in the dipping cup or tube by having the tube through which the ink is flowed or pressed into the dipping-cup made capable of being extended down either through an inner or intermediate surrounding cylinder, or not, to the bottom of the inkstand, and having a suitable packing at the lower end of the tube or in the bottom of the inkstand, or both, so that by screwing or otherwise adjusting downward the tube against the bottom of the inkstand the main body of ink in the reservoir is entirely shut off from that in the tube, or the latter when emptied kept dry and, by raising the tube, the supply to the dipping-cup reestablished, when the tube may again be lowered to act as a tight cut-off, as already referred to. Said cup-tube is likewise provided with a piston or plunger, which may be circumferentially packed, and which, acting in concert with a measuring-cylinder, it is made to lie within or fit, serves to fix or regulate the supply to the dipping cup and to force the ink upward into the latter, and which action or actions, when combined with the cut-off at the bottom of the tube, that makes leakage round the plunger of less account, constitutes a valuable improvement.

The portion marked *a a* in the accompanying drawings represents the reservoir of the inkstand, and which may be made of any suitable form and material. The dipping-cup *g*, with its supplying-tube *h*, is made capable of being raised or lowered by means of a screw-thread, *k*, or otherwise. Said cup-tube is extended downward so that when adjusted to its lowest position it forms a cut-off at its lower end with the bottom of the reservoir where a packing, *j*, is provided, or the lower end of the tube furnished with a packing, or both, to establish a close cut-off, which effectually shuts off communication between the reservoir and tube with its dipping-cup, excepting when it is desired to replenish the supply to the dipping-cup, when the tube is temporarily raised and afterward lowered for that purpose. The bottom of the reservoir I prefer to countersink on its inside with an ink-receiving chamber or cylinder, in which may lie the cut-off packing *j* to the cup-tube, and which may receive for play within it a disk or piston, *i*, made to surround the lower portion of the cup-tube, and formed of cork or any other suitable material.

In the drawings an intermediate cylinder, *h*, is shown as forming in the ink-receiving cavity of the reservoir the sides to said cavity, so far as the close but free fit of the piston *i* therein is concerned, and such portion of said cavity as is bound by the intermediate cylinder may accordingly be denominated the "measuring-space." The introduction, however, of this inner or intermediate cylinder is optional. Said cylinder *b* is shown open at the bottom and cast in one piece with the screw-cap *c*, which fits into the neck *d* of the reservoir *a*, and is represented as provided with a ring-washer, *e*, which fits on the top of said neck and makes it air-tight. There is, or may be, a small hole, *f*, in the screw-cap, to admit air to the main reservoir, when desired.

As before observed, the inner or intermediate cylinder may be dispensed with, in which case the piston *i* would work within or in and out of the cavity in the bottom of the reservoir free from the interposition of the inner cylinder, and would have to be made larger accordingly to correspond with the size of said cavity, or the latter be reduced to suit the piston, the essential feature of the improvement being the same, and by which the small portion of ink wanted for use in the dipping-cup and its tube is gaged and shut off from that in the reservoir, and the atmosphere excluded from entering the latter through the dipping-cup and its tube; also, the heat of the room or sun prevented from causing the ink to overflow the dipping-cup. I here prefer to illustrate my improvement as provided with an additional or intermediate cylinder, and the latter made capable of adjustment and extension to the bottom of the reservoir, and arranged to receive the piston or plunger, which works in the cavity in the bottom of the reservoir.

Under such arrangement or construction to get ink into the dipping-cup, both the dipping-cup with its tube and inner or intermediate cylinder is slightly unscrewed or raised. Then the latter (and after, in the act of unscrewing, having supplied air through the aperture *f* to the reservoir) is screwed down, and subsequently the dipping-cup with its tube and plunger likewise screwed down to force the ink so gaged or measured in the cavity of the reservoir up into the dipping-cup to a proper level. By such action or actions, too, communication between the ink in the dipping-cup or its tube and that in the reservoir is cut off.

Having now described my improvement, I claim as new and useful in fountain-ink-stands—

1. Extending the tube of the dipping-cup, made adjustable up and down by screw or otherwise, down to the bottom of the reservoir, and so fitting or packing the lower end of said tube and bottom of the reservoir, or either, as to establish a cut-off at pleasure between the dipping-cup and reservoir at the bottom of the latter, substantially as specified.

2. In combination with the piston or cut-off for closing the tube at the end of the stroke, substantially as shown and described, the formation in the bottom of the reservoir of a cup or recess, as herein set forth.

3. The combination, with the reservoir and adjustable dipping cup or tube, of an inner or intermediate cylinder for operation together, essentially as specified.

FRANCIS DRAPER.

Witnesses:
JOSEPH GAVETT,
ALBERT W. BROWN.